M. J. TODD.
TRAIN OF WHEELED VEHICLES.
APPLICATION FILED APR. 22, 1913.
1,083,777.
Patented Jan. 6, 1914.
2 SHEETS—SHEET 1.
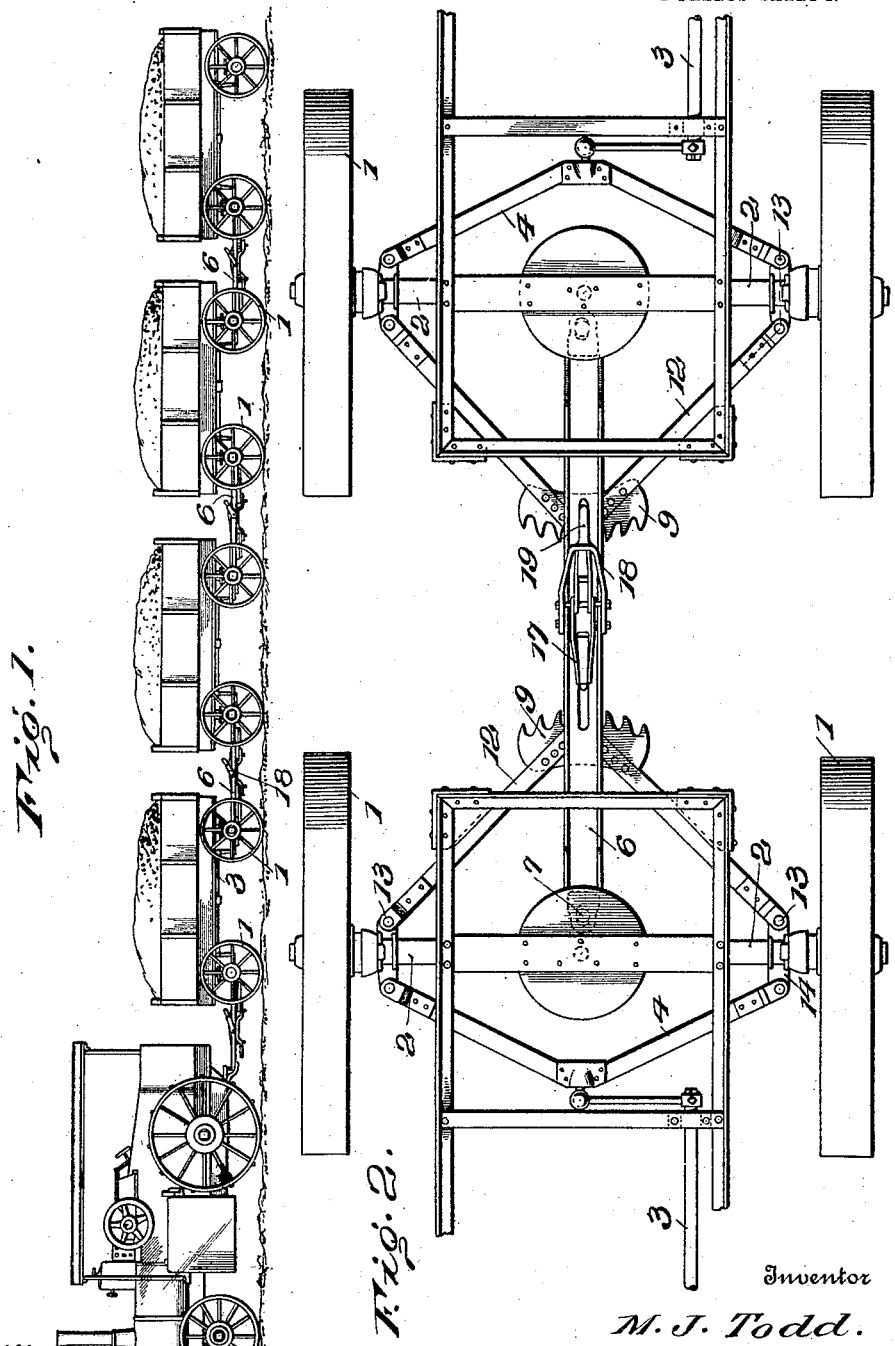
Witnesses
W. A. Williams
Francis S. Maguire
Inventor
M. J. Todd.
By
Attorney

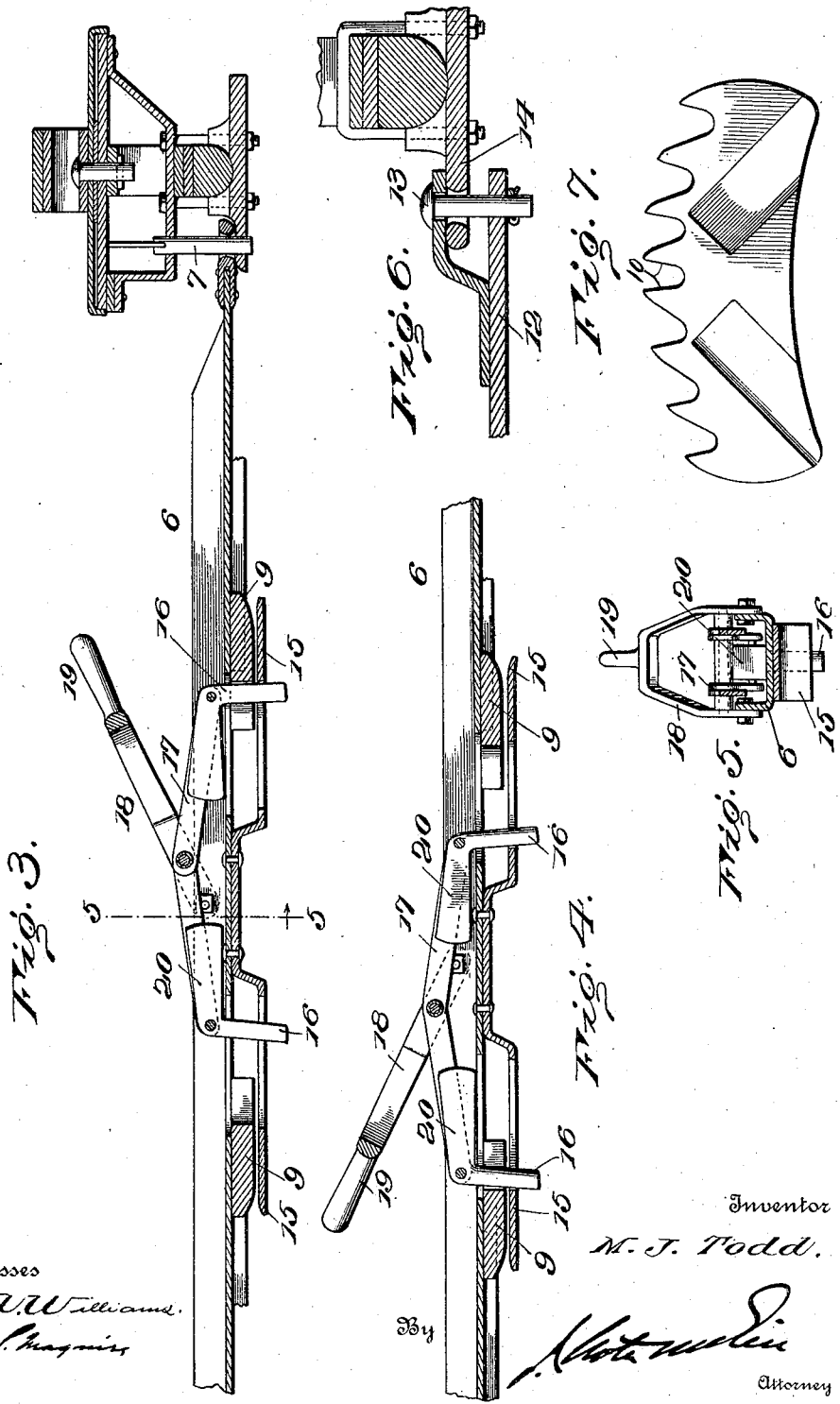

UNITED STATES PATENT OFFICE.

MARQUIS J. TODD, OF BUFFALO, NEW YORK, ASSIGNOR TO BUFFALO PITTS COMPANY, OF BUFFALO, NEW YORK, A CORPORATION OF NEW YORK.

TRAIN OF WHEELED VEHICLES.

1,083,777.   Specification of Letters Patent.   Patented Jan. 6, 1914.

Application filed April 22, 1913. Serial No. 762,825.

*To all whom it may concern:*

Be it known that I, MARQUIS J. TODD, of Buffalo, in the county of Erie and State of New York, have invented certain new and useful Improvements in Trains of Wheeled Vehicles; and I do hereby declare the following to be a full, clear, and exact description of the invention, such as will enable others skilled in the art to which it appertains to make and use the same.

This invention relates to trains of wheeled vehicles capable of being moved in either direction without the necessity of reversing the position of the engine relatively to the train, the several vehicles being connected by coupling members which are pivoted to adjacent vehicles and capable of being locked to each rear or successive vehicle.

Heretofore when it has been desired to reverse the direction of travel of a train, and any two vehicles, or the engine and the next adjacent vehicle, are at an angle to each other, difficulty has been experienced in locking the coupling member to the vehicle which is now the rear one relatively to the direction of travel.

One object of my invention is to overcome this difficulty, and this I accomplish by providing means whereby the coupling members may be readily locked to a vehicle regardless of the position it occupies in respect to the next adjacent vehicle.

A further object is to allow the coupling members if locked to a rear vehicle while the latter is at an angle, to be moved and automatically and permanently locked when in line with the longitudinal center of such vehicle.

A further object is to effect the unlocking of a coupling member from one vehicle as it is locked to another vehicle.

And a further object is to provide a coupling member capable of being locked to either of two vehicles and which, while so locked, will be flexible in relation to both vehicles.

In the accompanying drawings, Figure 1 is a side elevation of a train of vehicles equipped with my improvements. Fig. 2 is an enlarged plan view showing the coupling between two vehicles. Fig. 3 is a central longitudinal sectional view of one of the coupling members. Fig. 4 is a similar view showing the locking means in a different position. Fig. 5 is a section on line 5—5, Fig. 3. Fig. 6 is a sectional detail. Fig. 7 is a plan of one of the racks.

In the drawings I have shown a train of vehicles, each vehicle having four carrying wheels 1, the axles 2 of which are pivoted and connected together so that both sets of wheels and axles will move in unison for facility in turning a curve. Any suitable means may be employed for connecting the axles, that shown comprising crank-shaft 3 connected at its ends through divergent arms 4 to the axles 2 at points near the ends thereof.

All the vehicles of a train are coupled by corresponding means, and each coupling element is capable of being locked to either of two vehicles regardless of the relative angle betwen the vehicles, and in unlocking from one vehicle a locking is effected with another vehicle.

6 designates the coupling member which is shown in the form of a bar which, at its opposite ends, is pivoted to the running gear of adjacent vehicles. According to the means shown, the ends of the coupling bars are engaged by vertically-movable pins 7, so as to be free to move in all directions.

9 designates racks which are carried by each vehicle at the ends. Each rack is provided with a series of notches in its outer edge, which edge is curved on a radius with the pivot pin 7 as the center. Each rack has a central notch 10, the side walls of which are substantially straight or nearly parallel to the longitudinal axis of the vehicle. The notches to either side of the center are curved in opposite directions, that is to say, the inner wall of each notch of each side series is inclined toward the central notch, while the outer wall of each side notch is practically straight. Each rack is mounted on a frame which is shown as composed of two divergent arms 12 which are flexibly connected to an axle, (see Fig. 6) so as to allow the vehicles composing the train to conform to irregularities in the road or to ride over obstructions without placing unnecessary strain on the racks and their connecting frames. I have shown each frame arm at its rear end bifurcated and formed with coincident eyes to accommodate a pivot pin 13 which extends through an enlarged opening in a lug or clip 14 secured to the axle and projecting between the bifurcated members of the arm. By these means the rack frames are flexibly connected to the axles.

Each coupling bar is shown as provided on its under side with fingers 15 which are spaced apart from, and parallel the under side of the bar, forming spaces to accommodate the racks. In these fingers, and also in the coupling bar, are formed longitudinal slots through which are designed to project pins 16 which constitute means for locking the coupling bars to the vehicles, said pins being designed to enter the notches of the respective plates. Each pin at its upper end is pivoted to a carrier 17, and the carrier in turn is pivoted at its center to a shifter 18 which is shown in the form of a bail, the lower ends of the sides of which are pivoted to the sides of the coupling bar, while at its upper end it is provided with a handle 19. Each pin 17 at its upper end has a weight 20 at right angles thereto, the purpose of which is to hold the pin normally in vertical position. These pins 17 are capable of being swung on their pivots, but normally will be held perpendicular relatively to the coupling bars by their respective weights.

When one coupling pin is in engagement with its respective rack, the other coupling pin will be out of engagement with its respective rack. When a train of vehicles is moved on a straight line the coupling pin 17 of the forward end of the rear vehicle of each pair of vehicles will be in engagement with the central notch of its rack, thereby holding the coupling bar rigid in respect to such rear vehicle, the coupling bar being free to move on its pivot in respect to the rear end of the forward vehicle of the pair. If it be desired to reverse the direction of travel of the train, the operator throws the shifter 18 so as to disengage the coupling pin of what has been the front end of the rear vehicle of the pair from the central notch of its respective rack and at the same time throws the other coupling pin into engagement with the rack of the now rear vehicle of the pair, and if adjacent vehicles be at an angle the pin will engage with one of the notches on the curved edge of the rack. The coupling bar cannot move farther outwardly because of the resistance of the outer or straight wall of the notch with which its pin is in engagement, but as the two vehicles approach a straight line the pivoted coupling pin will be moved automatically from one notch to the other until the straight line is attained between the two vehicles, whereupon the pin will enter the central notch, and thereafter the coupling bar will be permanently locked in line with the longitudinal center of the rear vehicle.

It will be understood, of course, that when the direction of travel of the train is reversed so that the engine is at the rear, the steering is accomplished at the front end of the foremost vehicle of the train. Any suitable means may be employed for effecting the steering, as, for instance, that shown and described in Letters Patent of the United States No. 981,499 issued to me on the 10th day of January, 1911.

The advantages of my invention will be appreciated by those skilled in the art. It will be observed that the coupling bars, while retaining their locked relation to a vehicle, may be automatically moved relatively to each vehicle until in line with the longitudinal centers thereof, whereupon they will be fixedly locked and so held until it is desired to again reverse the direction of travel. It will also be observed that regardless of the angle between the several vehicles of a train, the coupling bar may be readily unlocked from one vehicle and locked to the next adjacent vehicle, and that this unlocking and locking is effected by the movement of a single element.

While I have shown and described means which I have found most advantageous for carrying out my present invention, it will be understood that I do not restrict myself to the construction and arrangement shown for accomplishing the purposes in view.

I claim as my invention:

1. In combination with a train of wheeled vehicles, coupling members between adjacent vehicles, and means for locking a coupling-member to either of its respective vehicles regardless of the relative positions of such vehicles, such means being constructed and arranged to allow a relative movement between a coupling member and the vehicle to which it is locked when said coupling member is on either side of the center line of draft.

2. In combination with a train of wheeled vehicles, coupling-members pivotally connected to adjacent vehicles, locking means carried by each coupling member, and means carried by adjacent vehicles with which said locking means may coöperate to lock a coupling member to either of adjacent vehicles regardless of the relative positions of such vehicles, such coupling means being constructed and arranged to allow the coupling member to move relatively thereto when on either side of the center line of draft.

3. In combination with a train of wheeled vehicles, coupling-members pivotally connected to adjacent vehicles, locking pins carried by each coupling member, means for shifting such locking pins, and racks carried by adjacent vehicles with which said pins may engage to lock a coupling member to either of adjacent vehicles regardless of the relative positions of such vehicles.

4. A wheeled vehicle having a coupling bar pivoted thereto, a curved rack carried by said vehicle, and a locking member carried by said coupling bar for engaging said rack, which latter is formed to permit the coupling bar to be swung on its pivot only toward the longitudinal center of the vehicle when the locking member is in engagement with the rack.

5. A wheeled vehicle having a coupling bar pivoted thereto, a curved rack carried by said vehicle, and a locking member carried by said coupling bar for engaging said rack, said rack having notches formed to permit the coupling bar to be swung on its pivot from either side to the longitudinal center of the vehicle when the locking member is in engagement with said rack.

6. A wheeled vehicle having a coupling bar pivoted thereto, a curved rack carried by said vehicle, and a locking member carried by said coupling bar for engaging said rack, said rack having two sets of notches curved in opposite directions toward the center of the rack, said notches allowing the coupling bar to be swung laterally while the locking member is in engagement therewith.

7. A wheeled vehicle having a coupling bar pivoted thereto, a curved rack carried by said vehicle, and a locking member carried by said coupling bar for engaging said rack, said rack having two sets of notches curved in opposite directions toward the center of the rack, one wall of each notch being substantially on a straight line, and the opposite wall inclined.

8. A wheeled vehicle having a coupling bar pivoted thereto, a curved rack carried by said vehicle having a central notch with opposite walls on straight lines, and having two series of notches on opposite sides of said central notch, each series being curved toward the center of said rack, and a pivoted locking member carried by the bar and capable of riding in one direction over each set of teeth, but fixedly held by said central notch.

9. In combination with a train of wheeled vehicles, coupling members pivoted to adjacent vehicles, each vehicle having a rack extending horizontally through the central line of draft, and locking means carried by the coupling members for coöperating with said racks permitting a relative movement between a vehicle and its respective coupling member, as the latter is moving toward the central line of draft.

10. In combination with a train of wheeled vehicles, each vehicle having shiftable axles, and means connecting such axles, coupling members between adjacent vehicles, locking means carried by each coupling member, coöperating locking agencies carried by each vehicle at its opposite ends and with which said locking means may engage, and means for flexibly connecting said coöperating locking agencies to said vehicles at the ends thereof.

11. In combination with a pair of wheeled vehicles, a coupling member between such vehicles, locking means carried by said coupling member for locking the latter to one or the other of said vehicles, and means for actuating said locking means to cause it to unlock the coupling member from one vehicle as it is locked to the other vehicle.

12. In combination with a pair of wheeled vehicles, a coupling bar pivotally connected to both vehicles, a sliding locking element carried by said coupling bar for fixedly holding the latter to one or the other of said vehicles, and means for actuating said sliding locking element to unlock the coupling bar from one vehicle as it is locked to the other vehicle.

13. In combination with a pair of wheeled vehicles, a coupling bar pivoted to both vehicles, each vehicle having a toothed portion, locking members carried by said coupling bar and selective at the will of the operator for engaging the toothed portion of one or the other of said vehicles, and means for conjointly actuating both coupling members to unlock the coupling bar from one toothed portion as it is locked to the other toothed portion.

In testimony whereof, I have signed this specification in the presence of two subscribing witnesses.

MARQUIS J. TODD.

Witnesses:
  FANNIE S. MAGUIRE,
  MILDRED P. IMIRIE.

---

Copies of this patent may be obtained for five cents each, by addressing the "Commissioner of Patents, Washington, D. C."